United States Patent
Axford et al.

(10) Patent No.: US 10,392,101 B2
(45) Date of Patent: Aug. 27, 2019

(54) AIRCRAFT WITH A FOLDABLE WING TIP DEVICE

(71) Applicant: Airbus Operations Limited, Bristol (GB)

(72) Inventors: Tim Axford, Bristol (GB); Tony Fong, Bristol (GB); Stuart Alexander, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 341 days.

(21) Appl. No.: 15/306,400

(22) PCT Filed: Apr. 2, 2015

(86) PCT No.: PCT/GB2015/051032
§ 371 (c)(1),
(2) Date: Oct. 24, 2016

(87) PCT Pub. No.: WO2015/162399
PCT Pub. Date: Oct. 29, 2015

(65) Prior Publication Data
US 2017/0043864 A1    Feb. 16, 2017

(30) Foreign Application Priority Data
Apr. 24, 2014    (GB) .................................. 1407197.1

(51) Int. Cl.
*B64C 23/06*    (2006.01)
*B64C 3/18*    (2006.01)
(Continued)

(52) U.S. Cl.
CPC ............ *B64C 23/072* (2017.05); *B64C 3/185* (2013.01); *B64C 3/546* (2013.01); *B64C 3/56* (2013.01);
(Continued)

(58) Field of Classification Search
CPC ....... B64C 23/072; B64C 3/185; B64C 3/546; B64C 3/56; B64C 3/54; Y02T 50/14; Y02T 50/164
See application file for complete search history.

(56) References Cited

U.S. PATENT DOCUMENTS 2,444,332 A * 6/1948 Briggs ...................... B64C 3/56
114/313
2,719,682 A * 10/1955 Handel ..................... B64C 3/56
160/213
(Continued)

FOREIGN PATENT DOCUMENTS

CN    102762453    10/2012
CN    103419929    12/2013
(Continued)

OTHER PUBLICATIONS

International Search Report and Written Opinion cited in PCT/GB2015/051032, dated Aug. 10, 2015, fifteen pages.
(Continued)

*Primary Examiner* — Valentina Xavier
(74) *Attorney, Agent, or Firm* — Nixon & Vanderhye P.C.

(57) ABSTRACT

An aircraft including a wing (1) and a wing tip device (6). The wing tip device (6) is moveable between a flight configuration for use during flight and a ground configuration for use during ground-based operations. In the ground configuration the wing tip device is folded inwardly from the flight configuration such that the span of the aircraft is reduced. The wing tip device (6) is connected to the wing along a hinge axis (14) by spar beams (10 and 12) of the wing tip device, one of the beams being mounted for pivoting about a fixed axis and the other beam being mounted on a spherical bearing (15) to provide greater
(Continued)

freedom of movement. Various actuator arrangements may be provided to pivot the wing tip device.

20 Claims, 6 Drawing Sheets

(51) Int. Cl.
  *B64C 3/54* (2006.01)
  *B64C 3/56* (2006.01)
(52) U.S. Cl.
  CPC .............. *B64C 3/54* (2013.01); *Y02T 50/14* (2013.01); *Y02T 50/164* (2013.01)

(56) References Cited

U.S. PATENT DOCUMENTS

| | | | |
|---|---|---|---|
| 5,988,563 | A | 11/1999 | Allen |
| 6,743,504 | B1 | 6/2004 | Allen et al. |
| 9,889,920 | B2 * | 2/2018 | Harding ................... B64C 3/56 |
| 9,950,780 | B2 * | 4/2018 | Santini ..................... B64C 3/56 |
| 2012/0112005 | A1 | 5/2012 | Chaussee et al. |
| 2013/0099060 | A1 | 4/2013 | Dees et al. |
| 2013/0292508 | A1 * | 11/2013 | Fox .......................... B64C 3/56 244/49 |
| 2013/0327883 | A1 * | 12/2013 | Kordel .................... B64C 3/56 244/49 |
| 2017/0355441 | A1 * | 12/2017 | Winkelmann ............ B64C 3/56 |

FOREIGN PATENT DOCUMENTS

| | | |
|---|---|---|
| EP | 2727827 | 5/2014 |
| WO | 2008125868 | 10/2008 |

OTHER PUBLICATIONS

Chinese Office Action cited in Application No. 201580021473.2 dated Jul. 20, 2018, 15 pages.

Search Report cited in GB 1407197.1, completed Nov. 13, 2014, one page.

* cited by examiner

AIRCRAFT WITH A FOLDABLE WING TIP DEVICE

This application is the U.S. national phase of International Application No. PCT/GB2015/051032 filed Apr. 2, 2015 which designated the U.S. and claims priority to GB 1407197.1 filed Apr. 24, 2014, the entire contents of each of these applications are incorporated by reference.

BACKGROUND OF THE INVENTION

The present invention relates to aircraft and more specifically, but not exclusively, to passenger aircraft with wing tip devices.

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

In some suggested designs, aircraft are provided with wing tip devices which may be folded to reduce the span of the aircraft on the ground (compared to when the aircraft is configured for flight). However, there are technical challenges in providing a practical form of folding arrangement. Amongst the issues to be addressed are: the problem of providing a reliable hinge mechanism for accommodating the folding and unfolding of the wing tip device without impacting unduly on the design of the wing; and the problem of providing a compact and lightweight drive to effect the folding of the wing tip device. The present invention seeks to mitigate at least some of the above-mentioned problems.

SUMMARY OF THE INVENTION

According to a first aspect of the invention, there is provided an aircraft comprising a wing and a wing tip device at the tip of the wing, the wing comprising first and second spars that converge towards the wing tip device, wherein the wing tip device is moveable between:
  i. a flight configuration for use during flight, in which the wing tip device projects from the wing increasing the span of the aircraft and
  ii. a ground configuration for use during ground-based operations, in which ground configuration the wing tip device is pivoted away from the flight configuration such that the span of the aircraft is reduced,
and wherein the wing tip device is connected to the wing by a hinge arrangement associated with the first spar and allowing pivoting about a fixed hinge axis perpendicular to the longitudinal axis of the first spar, and by a pivotal mounting arrangement associated with the second spar, the mounting arrangement being disposed in the second spar perpendicular thereto whilst mounting the wing tip device for pivoting about the fixed hinge axis, the hinge arrangement and the pivotal mounting arrangement being arranged to allow the wing tip device to rotate about the hinge axis between the flight configuration and the ground configuration.

By providing such an arrangement, potential problems in providing a suitable folding mechanism for the wing tip device mounted on converging spars can be mitigated. The pivotal mounting arrangement provides a second mounting for the wing tip device, in addition to the fixed axis hinge and although the second mounting is on a second spar which is inclined to the first spar on which the fixed hinge mounting is provided, both mountings can still be disposed in respective bores in the first and second spars with those bores having axes perpendicular to the longitudinal axes of the spars.

Whilst it is possible within the broadest scope of the invention to provide an angled pivot mounting that provides a fixed pivot axis mounting as the pivotal mounting arrangement, it is especially preferred that the pivotal mounting arrangement comprises a spherical bearing mounted in the second spar. The extra degree of freedom provided by a spherical bearing as opposed to the more conventional choice of a bearing with a fixed hinge axis allows greater freedom of movement and allows a more simple and lightweight bearing arrangement to be adopted. It also allows for greater tolerances to be accommodated and for the effect of changes in dimensions, for example due to different thermal expansions of different materials. The latter point may be of particular significance in cases where wing tip devices are retrofitted. By employing a spherical bearing it becomes possible to mount the bearing in a bore in one spar with the axis of the bore perpendicular to the longitudinal axis of the spar but with an axis of pivoting coincident with a fixed hinge axis that is perpendicular to the longitudinal axis of the other spar. The spherical bearing needs to accommodate only small angular variations in the axis of pivoting and may therefore comprise a small portion only of a complete spherical surface.

In the flight configuration the trailing edge of the wing tip device may be a continuation of the trailing edge of the wing. The leading edge of the wing tip device may be a continuation of the leading edge of the wing, such that there is a smooth transition from the wing to the wing tip device. It will be appreciated that there may be a smooth transition, even where there are changes in sweep or twist at the wing/wing tip device junction. However, there are preferably no discontinuities at the junction between the wing and wing tip device. At least at the root of the wing tip device, and preferably along the length of the wing tip device, the upper and lower surfaces of the wing tip may be continuations of the upper and lower surfaces of the wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The wing tip device may comprise a spar beam which has a first end fixed in the wing tip device and a second distal end which, in the flight configuration is disposed in the wing. A fixed wing tip device having such a spar beam is described in US 2012/0112005, the contents of which is incorporated herein by reference. To allow the folding of the wing tip device in accordance with the present invention, the spar beam may be pivotally mounted; the pivotal mounting may be between the distal end and the fixed end of the spar beam.

The spar beam preferably passes through the hinge axis of the wing tip. The spar beam may have a through bore extending in a chordwise direction and accommodating a shaft defining the fixed hinge axis. The through bore is preferably perpendicular to the longitudinal axis of the spar beam.

The wing tip device may have a single spar beam connected to both the front and rear spars but is preferably provided with one or more additional spar beams. In that case the hinge arrangement and the spherical bearing may be supported on respective spar beams of the wing tip device. In embodiments of the invention described below the wing has front and rear spars on which front and rear spar beams of the wing tip are respectively mounted. One of the spar beams, which may be the front spar beam and which may be of smaller cross-section, has a distal end close to the hinge axis whilst the other spar beam, which may be the rear spar beam and may be of larger cross-section, has a distal end that extends beyond the hinge axis.

The hinge arrangement may be supported by the rear spar and the spherical bearing may be supported by the front spar. The hinge arrangement and the spherical bearing are preferably spaced apart.

The distal end of the spar beam may be disposed alongside the rear spar in the flight configuration of the aircraft.

A further spar is preferably provided in the wing adjacent to the wing tip device, the further spar being disposed between the first and second spars. The spar beam is preferably interposed between the first spar and the further spar; the spar beam may be disposed alongside the further spar in the flight configuration of the aircraft. Such arrangements provide additional strength to the wing towards its tip. The further spar is especially advantageous in embodiments of the invention in which an opening is provided in a lower surface of the wing for allowing the spar beam to move downwardly out of the wing when the wing tip device is pivoted to the ground configuration. Such a slot-shaped opening may then be bordered by the first spar and the further spar on its opposite sides.

The invention is especially advantageous in the case where the front and rear spars are made of composite material. In that case there is considerable advantage in bores in the spars extending perpendicular to the axes of the spars. It is, however, within the scope of the invention for the spars and other parts of the wing and the wing tip device to be made of composite materials and/or of metal alloys and/or other materials.

In embodiments of the invention described below the wing tip device comprises a spar beam which has a first end fixed in the wing tip device and a second end which, in the flight configuration, is disposed in the wing, wherein one or more actuators are provided for pivoting the wing tip device between the flight configuration and the ground configuration, the one or more actuators acting on the spar beam. The actuators may take any of a wide variety of forms and may for example be any suitable kind of hydraulic or electric drive.

The wing tip device may be a wing tip extension; for example the wing tip device may be a planar tip extension. In other embodiments, the wing tip device may comprise, or consist of, a non-planar device, such as a winglet.

According to a second aspect of the invention, there is provided an aircraft comprising a wing and a wing tip device at the tip of the wing, wherein the wing tip device is moveable between:
  i. a flight configuration for use during flight, in which the wing tip device projects from the wing increasing the span of the aircraft, and
  ii. a ground configuration for use during ground-based operations, in which ground configuration the wing tip device is pivoted about a hinge axis from the flight configuration such that the span of the aircraft is reduced, wherein the wing tip device comprises a spar beam which has a first end fixed in the wing tip device and a second end which, in the flight configuration, is disposed in the wing, and wherein one or more actuators are provided for pivoting the wing tip device between the flight configuration and the ground configuration, the one or more actuators acting on the spar beam.

By providing one or more actuators acting on the spar beam of the wing tip device, it becomes possible to provide a compact and lightweight arrangement for folding the wing tip device. In order to accommodate the pivoting, an opening may be provided in the lower surface of the wing and the spar beam may project through the opening in the ground configuration of the aircraft.

Preferably a first actuator, which may be a linear actuator, is provided for pivoting the wing tip device from the flight configuration to an intermediate configuration partway between the flight configuration and the ground configuration, and a second actuator, which may be a linear actuator, is provided for pivoting the wing tip device from the intermediate configuration to the ground configuration. By providing two actuators it becomes possible to have actuators suited in terms of their position, arrangement and/or size to respective stages of folding of the wing tip device. In an embodiment described below, a first actuator is connected at the distal end of the spar beam, which may be well spaced from the hinge axis. That makes it possible for even a small actuator to apply a relatively large turning moment to the wing tip device, which may be desired during a first stage of folding of the wing tip device from the flight configuration. In the embodiment described below a second actuator is connected to the spar beam between the distal end and the hinge axis. The second actuator may effect a second stage of folding of the wing tip device into the ground configuration and the second stage of folding may require lower turning moments than the first stage.

In another embodiment of the invention described below, a single actuator is provided. The actuator may be connected to a linkage that comprises a link that is connected to the spar beam and a link that is connected to the wing.

The linkage may comprise first and second links pivotally connected to each other at their first ends and pivotally connected to the spar beam and the wing respectively at their second ends, the actuator being pivotally connected to the first ends of the first and second links and to the wing.

The single actuator may be a linear actuator or a rotary actuator.

The linkage may comprise first and second links pivotally connected to each other at their first ends and connected by universal joints to the spar beam and the wing respectively at their second ends. The second end of the second link may be connected to the actuator which may in turn be secured to the wing.

A locking device may be provided for locking the first ends of the links to the wing when the wing tip device is in the flight configuration.

The first and second links may extend along a substantially straight path when the wing tip device is in the ground configuration. In that case they may act as a cross-brace for holding the wing tip device in the ground configuration.

Top and bottom faces of the first and/or second links may be effective to transfer loads between the wing tip device and the wing in the flight configuration of the aircraft. The faces may be provided with flattened lugs for this purpose.

More complex linkages with more links may also be provided.

The one or more actuators may be arranged such that the ratio of the amount of linear or rotary movement of the actuator to the angular movement of the wing tip device is relatively great in a region where the centre of gravity of the wing tip device is relatively far in a horizontal direction from the hinge axis and is relatively small in a region where the centre of gravity of the wing tip device is relatively close in a horizontal direction to the hinge axis. It will be understood that the terms "relatively great" and "relatively small" on the one hand, and the terms "relatively far" and relatively close" on the other hand, are comparisons with one another and not relative to any third measure. With such an arrangement, variation in the force required to be exerted or reacted by the actuator is reduced because the mechanical advantage of the actuator is relatively high when the turning moment applied to the wing tip is relatively high and the mechanical advantage is relatively low when the turning moment applied to the wing tip is relatively low. As will be understood from the embodiments of the invention described below, the arrangement just described can be achieved by having two actuators and/or by having a linkage between an actuator and the wing tip that provides a varying amplification of movement of the actuator to movement of the wing tip.

The invention may be applied to a military aircraft but is especially advantageous in the case of a passenger aircraft. The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to another aspect of the invention there is provided a wing for an aircraft as defined above.

It will of course be appreciated that features described in relation to one aspect of the present invention may be incorporated into other aspects of the present invention. For example, features described in relation to the aircraft of the first aspect of the invention may be incorporated into the aircraft of the second aspect of the invention and vice versa.

DESCRIPTION OF THE DRAWINGS

Embodiments of the present invention will now be described by way of example only with reference to the accompanying schematic drawings of which:

FIG. 3b is an isometric view of a part of the embodiment shown in FIG. 3a;

DETAILED DESCRIPTION

Figure 1:
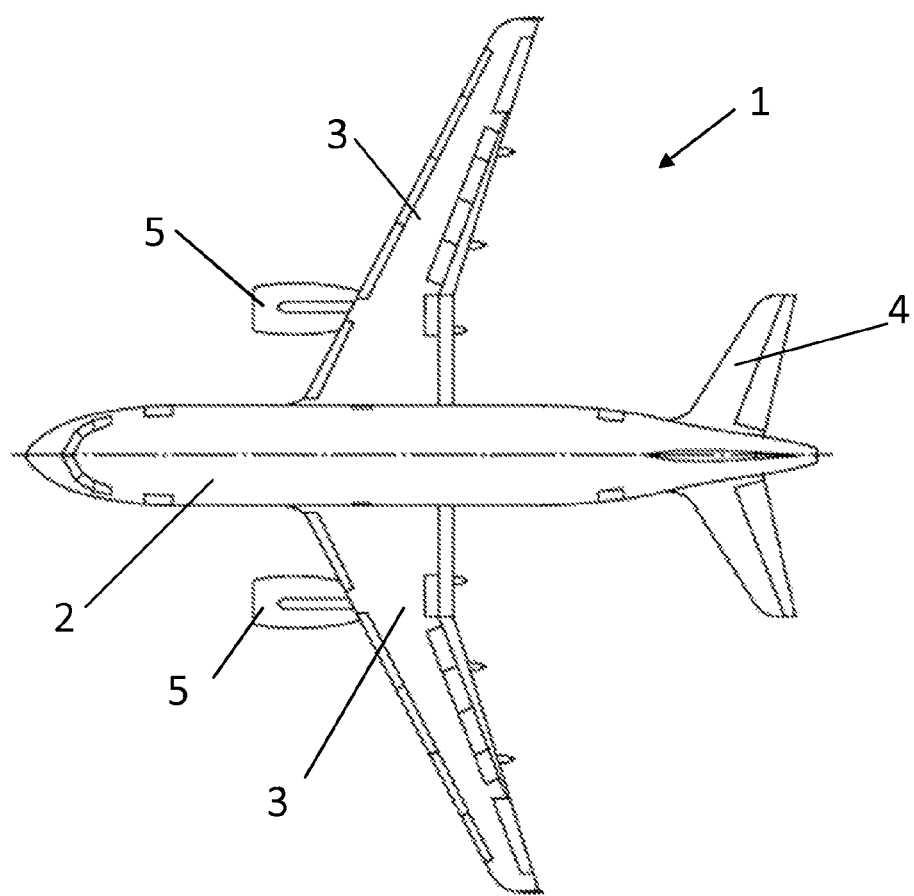
FIG. 1 is a top view of a passenger aircraft to which a wing tip device may be fitted.

FIG. 1 shows a passenger aircraft 1 having a fuselage 2, wings 3, a tailplane 4 and engines 5. The aircraft shown in FIG. 1 is a simply one example of an aircraft to which the invention may be applied by fitting wing tips. The wing tips may be retro-fitted or fitted during manufacture of the aircraft.

Figure 2A:
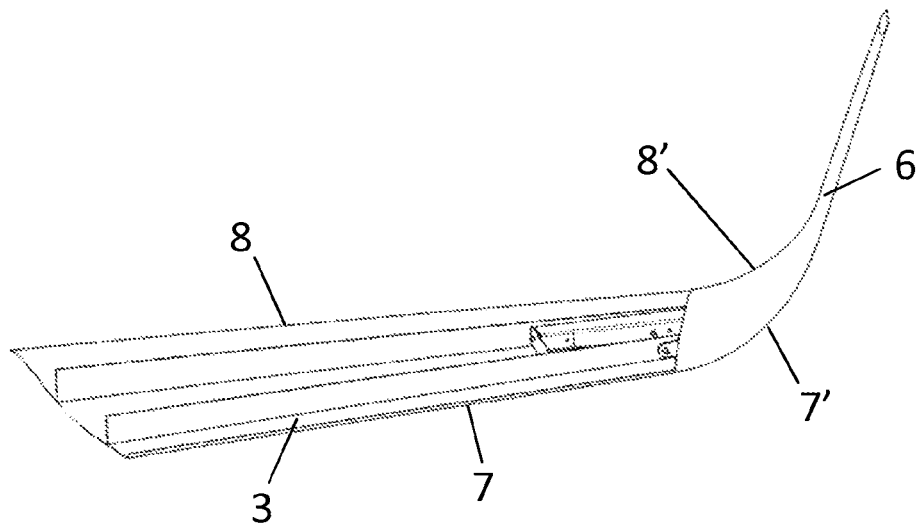
FIG. 2a is an isometric view of a portion of a wing and a wing tip device on a passenger aircraft, the wing tip device being shown in the flight configuration.
Figure 2B:
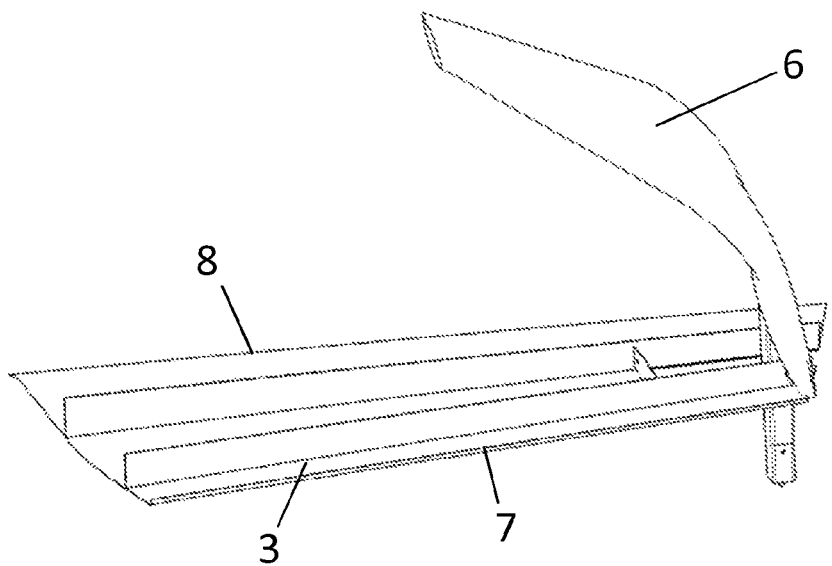
FIG. 2b shows the wing and wing tip device of FIG. 2a but with the wing tip device in a ground configuration.

FIGS. 2a and 2b are isometric views of part of a wing that may for example be one of the wings 3 shown in FIG. 1, the wing 3 having a wing tip device 6 at the tip thereof. In FIGS. 2a and 2b, the wing skin has been removed in the drawings to illustrate some of the internal wing structure (described below in more detail with reference to FIG. 3a).

The wing tip device 6 is moveable between a flight configuration (FIG. 2a) and a ground configuration (FIG. 2b). In the flight configuration, the leading and trailing edges 7', 8' of the wing tip device 6 are continuations of the leading and trailing edges 7, 8 of the wing 3. Furthermore, the upper and lower surfaces of the wing tip device 6 (not shown) are continuations of the upper and lower surfaces of the wing (not shown). Thus, there is a smooth transition from the wing 1 to the wing tip device 3.

The wing tip device 6 is placed in the flight configuration for flight. In the flight configuration, the wing tip device 6 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when maneuvering around the airport (such as the span and/or ground clearance required for gate entry and safe taxiway usage). Thus, in embodiments of the invention described below the wing tip device 6 is moveable to a ground configuration for use when on the ground. In the ground configuration (FIG. 2b) the wing tip device 6 is folded inwardly, from the above-mentioned flight configuration.

Changing the span of an aircraft is known per se. For example, in some suggested designs, military aircraft are provided with wings which may be folded upwardly to reduce the span of the aircraft on the ground (compared to when the aircraft is configured for flight). However, a disadvantage with such arrangements is that they tend to require heavy actuators and/or locking mechanisms to deploy the wing and to securely hold it in the flight configuration.

Figure 3A:
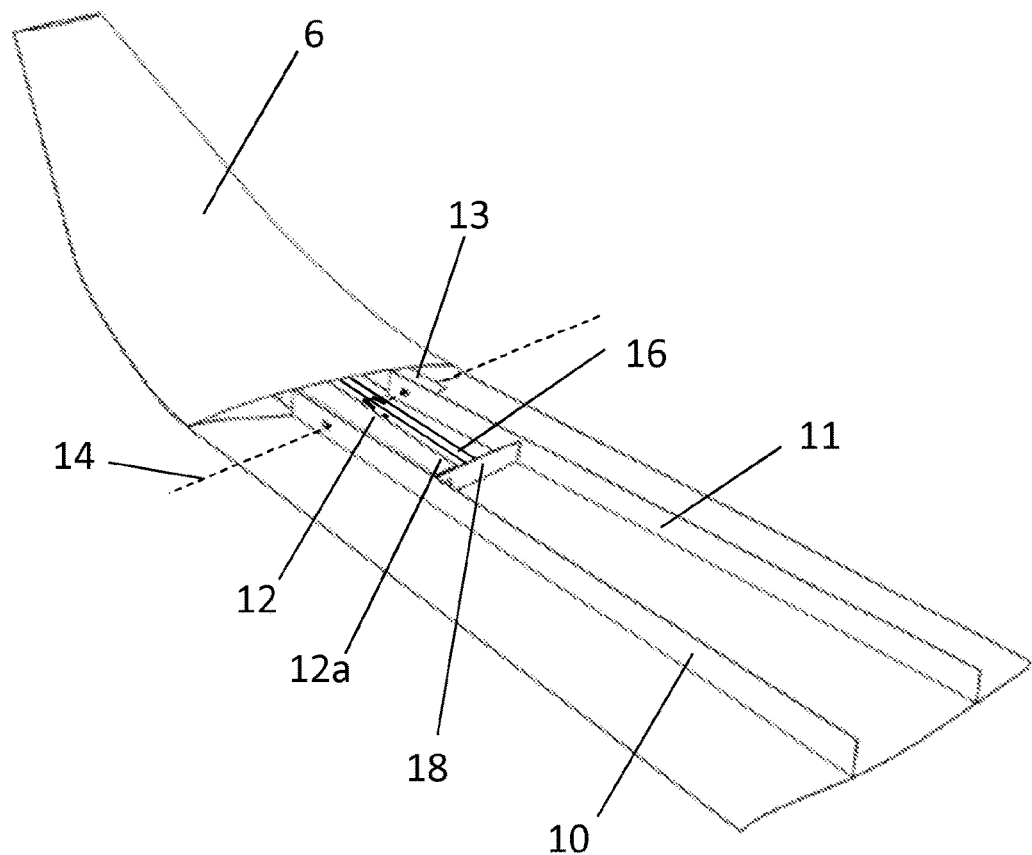
FIG. 3a is an isometric view of a wing and wing tip device of the general form shown in FIGS. 2a and 2b, showing a wing tip mounting according to an embodiment of the invention.
Figure 3B:
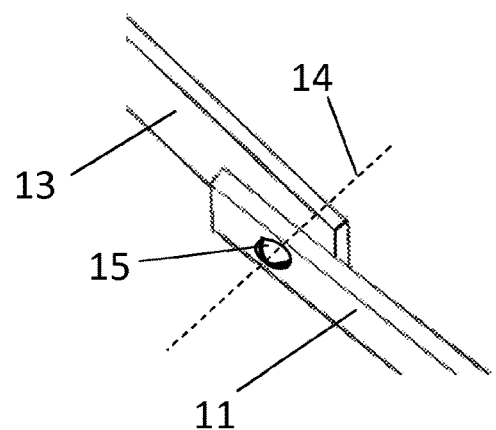

Referring now also to FIG. 3a, the wing 3 shown therein has a rear spar 10 and a front spar 11 made of composite materials. The wing tip device 6 has a rear spar beam 12 and a front spar beam 13, the spar beams 12, 13 being fixed in the wing tip but pivotally mounted on the wing spars 10 and 11 respectively. The rear spar beam 12 and the rear wing spar 10 are pivotally connected for hinging about a fixed axis 14, shown by a dotted line in FIG. 3a and a transverse through bore is provided in the rear wing spar 10 to facilitate such a fixed axis pivotal connection. Especially as the spar 10 is of composite construction the transverse bore extends perpendicular to the longitudinal axis of the wing spar 10. The front spar beam 13 is mounted on a spherical bearing 15 fixed in a bore of the front spar 11 of the wing, the bore extending perpendicular to the longitudinal axis of the spar 11. The centre of the spherical bearing 15 lies on the fixed hinge axis 14. The spherical bearing 15 is not seen in FIG. 3a but is shown in FIG. 3b. The front spar beam 13 is connected adjacent to its end to the bearing 15 by a transverse projecting part on the front spar beam 13. The mounting of the spar beam 13 on the spar 11 thus potentially allows pivoting about a range of axes, but the other pivotal connection of the spar beam 12 to the spar 10 constrains the pivotal motion to pivoting about the fixed axis 14. That arrangement mitigates the difficulties arising from the rear and front spars not being parallel.

As shown in FIG. 3a the rear spar beam 12 extends beyond the fixed hinge axis 14 alongside the rear wing spar 10 and has a distal end 12a adjacent to a rib 18. A releasable latch (not shown) may be provided in the distal end 12a, the latch being engageable in an opening in the rib 18. With the latch engaged the rear spar beam is held against rotation and the wing tip device 6 is therefore locked in the flight configuration. When required, however, and when on the ground, the latch can be released, freeing the wing tip for folding about the hinge axis 14 and an actuator arrangement can be employed to pivot the wing tip from the flight configuration to the ground configuration. It will be appreciated that during such pivotal movement the part of the rear spar beam 12 that extends beyond the hinge axis 14 will pivot downwardly through the lower skin of the wing which has an opening, which may be closable by a separately actuated door (not shown), to allow such pivoting. A further spar 16 (shown in FIG. 3a but not in FIGS. 2a and 2b) is provided between the spars 10 and 11 at the tip of the wing, extending inwardly to the rib 18. The spar 16 lies adjacent to the rear spar beam 12 on the opposite side to the rear spar 10 to provide additional strength to the wing in that area, which is of particular advantage given the need for the opening in the lower skin of the wing to allow the distal end of the rear spar beam 12 to pivot downwardly. As well as providing one or more locking devices for locking the wing tip device 6 in the flight configuration, one or more locking devices may also be provided for locking the wing tip device 6 in the ground configuration.

Various actuator arrangements that may be employed in different embodiments of the invention to effect the pivoting of the rear spar beam 12 will now be described.

Figure 4:
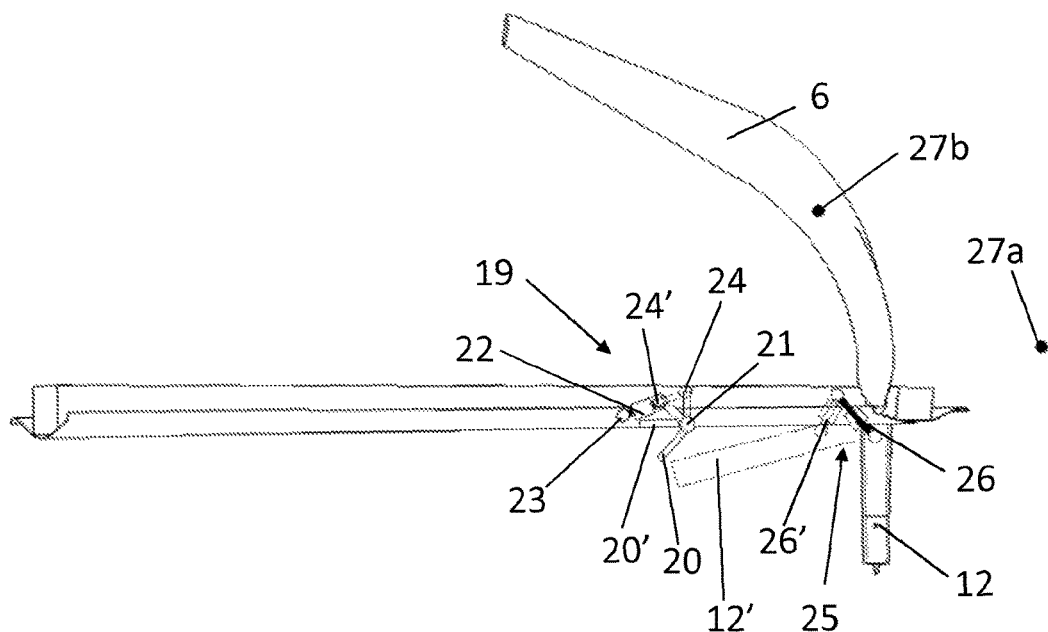
FIG. 4 is a front view of a wing and wing tip device of the general form shown in FIGS. 2a and 2b, showing a first actuator arrangement according to an embodiment of the invention.

FIG. 4 shows a first actuator arrangement employing a first actuator 19 and a second actuator 25. The first actuator 19 comprises a pivotally mounted L-shaped link 20 pivotally mounted at a pivot 21, and a linear actuator mechanism 22 pivotally mounted on the wing at a pivot 23 and pivotally connected to one end of the L-shaped link at a pivot 24. The linear actuator may be a hydraulic or electrical actuator which is extensible and retractable. FIG. 4 shows the position of the actuators when the wing tip device is in both the ground configuration and an intermediate configuration (where the wing tip device is between the flight configuration and the ground configuration). Where the position of a given actuator component differs between the intermediate configuration and the ground configuration, a dashed number is used to label the component in the intermediate position in FIG. 4. A second actuator 25 is also provided and comprises a second linear actuator mechanism 26 pivotally connected to the wing and to the spar beam 12. The first actuator 19 is employed to rotate the wing tip device through a first stage of rotation from the flight configuration towards the ground configuration into an intermediate position shown in feint outline in FIG. 4. Whilst the second actuator 26 is operational through the first stage of movement, most of the force on the wing tip device is provided by the first actuator 18 which is able to apply a substantially greater turning moment, being substantially further from the axis of rotation 14. Reference numeral 27a designates the position of the centre of gravity of the wing tip device in the flight configuration and reference numeral 27b shows the position of the centre of gravity in the ground configuration. The centre of gravity of the wing tip device is raised faster at the beginning of the rotation of the wing tip device towards the ground configuration and it is therefore at that stage that the greatest turning moment is required. To rotate the wing tip device to the flight configuration, the procedure described above is reversed; the L-shaped link 20 may automatically engage (and disengage) the rear spar beam 12.

Figure 5:
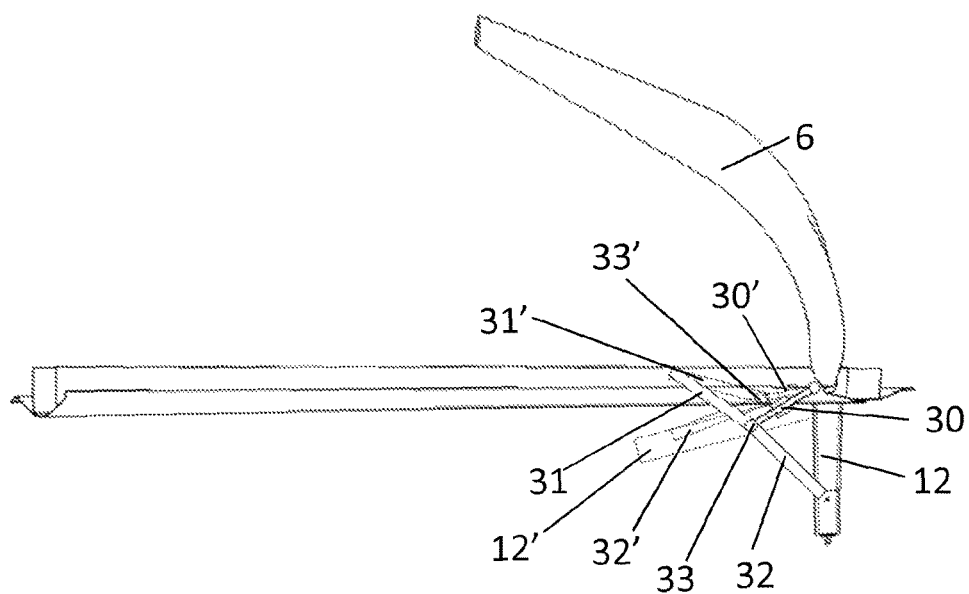
FIG. 5 is a front view of a wing and wing tip device of the general form shown in FIGS. 2a and 2b, showing a second actuator arrangement according to a further embodiment of the invention.

FIG. 5 shows a second actuator arrangement employing a second actuator 30 and a linkage comprising a first link 31 and a second link 32. The links 31 and 32 are connected together at their first ends at a pivot 33. The second end of the link 31 is pivotally connected to the wing and the second end of the link 32 is pivotally connected to the rear spar beam 12. The actuator is pivotally connected to the wing close to the hinge axis 14 at one end and is connected to the pivot 33 at the other end. FIG. 5 shows the position of the actuator when the wing tip device is in both the ground configuration and an intermediate configuration (where the wing tip device is between the flight configuration and the ground configuration). Where the position of a given actuator component differs between the intermediate configuration and the ground configuration, a dashed number is used to label the component in the intermediate position in FIG. 5. As can be seen in FIG. 5, an actuator arrangement of this kind can be very compact, requiring only a small change in length of the linear actuator to effect a full pivoting of the wing tip.

Figure 6A:
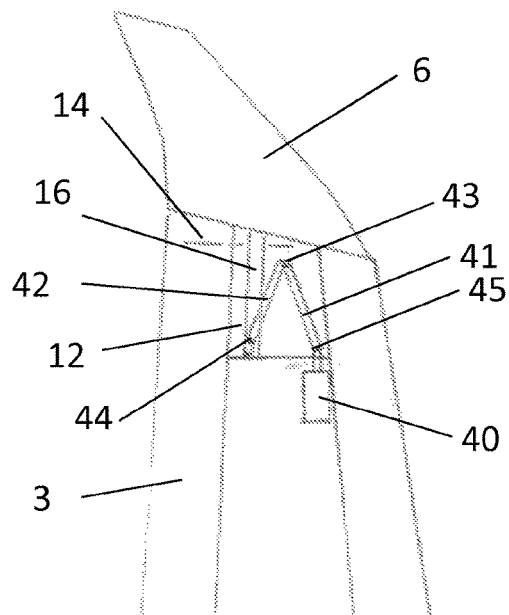
FIG. 6a is a plan view of a wing and wing tip device of the general form shown in FIGS. 2a and 2b, showing a third actuator arrangement according to a still further embodiment of the invention the wing tip device being in the flight configuration.
Figure 6B:
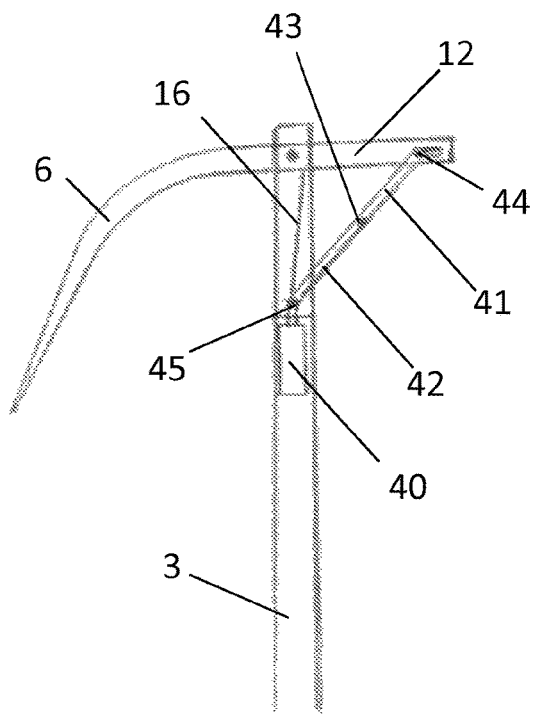
FIG. 6b is a front view of the wing and wing tip device of FIG. 6a, showing the third actuator arrangement according to FIG. 6a but with the wing tip device being in the ground configuration.
Figure 6C:
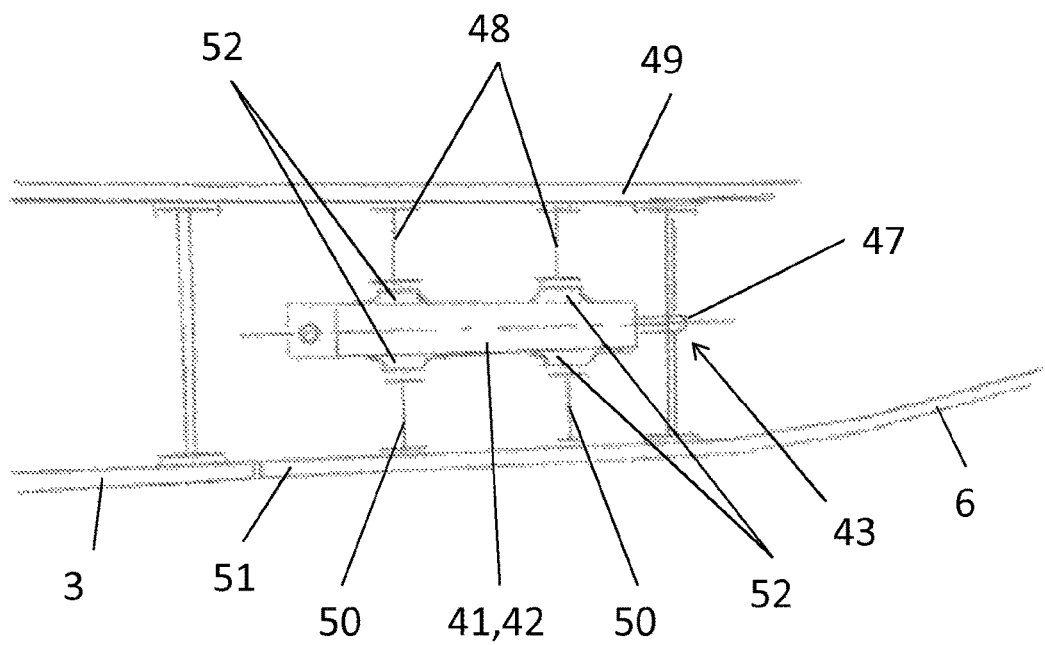
FIG. 6c is a front view of part of the wing and wing tip device shown in FIGS. 6a and 6b, with the wing tip device being shown in the flight configuration.

FIGS. 6a and 6b show a third actuator arrangement employing a rotating actuator 40 and a pair of links 41 and 42. In FIG. 6a, the top wing skin has been removed to show some of the internal wing structure. It can be seen that the further spar 16 described above with reference to FIG. 3a is also shown in FIGS. 6a and 6b; as can be seen in FIG. 6b, the spar is tapered so that its depth reduces towards the tip of the wing; that tapering allows the link 42 to be accommodated below the spar in the flight configuration (in FIG. 6a the part of the link 42 behind the spar 16 is shown in solid rather than dotted outline for the sake of clarity). The links 41 and 42 are connected together at their first ends at a pivot joint 43. The second end of the link 42 is connected to the rear spar beam 12 at a first cardan joint 44. The rotating actuator 40 is mounted in the wing where space allows and is connected to the second end of the link 41 via a second cardan joint 45. FIG. 6a shows the actuator arrangement and wing tip in the flight configuration and FIG. 6b shows the actuator arrangement and wing tip in the ground configuration. As shown in FIG. 6b, the links 41 and 42 may extend along a straight path in the ground configuration, thereby providing a cross-brace to hold the wing tip device 6 in its ground configuration; that is of particular significance in windy conditions. In use, rotation of the actuator 42 causes force to be exerted on rear spar beam 12 via the links 41, 42 such that the wing tip device pivots. An actuator arrangement of this kind can again be compact when folded and can therefore be accommodated in the wing close to its tip even though space is limited there The arrangement shown in FIGS. 6a and 6b may be enhanced in various ways as shown in FIG. 6c. For example the links 41 and 42 may be provided with a spigot 47 at their pivotal connection 43, for engaging a locking device (not shown) on the wing structure, when the wing tip device 6 is in the flight configuration. Also the links 41 and 42 may have a depth selected so that in the flight configuration they are an interference fit between stingers 48 associated with the top wing skin 49, and stingers 50 associated with a door 51 which is part of the wing tip device 6. As will be understood, the small gaps shown in FIG. 6c between the links 41, 42 and the stingers 48 and 50 do not exist once the wing tip device is fully positioned in the flight configuration; thus vertical loads may be transferred through the stingers 48,50 and the flattened lugs 52 which project from the top and bottom faces of the links 41,42.

Whilst the present invention has been described and illustrated with reference to particular embodiments, it will be appreciated by those of ordinary skill in the art that the invention lends itself to many different variations not specifically illustrated herein. By way of example the wing tip device need not necessarily be of the shape shown in the drawings but could be of many other shapes. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing and a wing tip device at the tip of the wing, the wing comprising first and second spars that converge towards the wing tip device, wherein the wing tip device is moveable between:
   i. a flight configuration for use during flight, in which the wing tip device projects from the wing increasing the span of the aircraft, and
   ii. a ground configuration for use during ground-based operations, in which ground configuration the wing tip device is pivoted away from the flight configuration such that a span of the aircraft is reduced,
   and wherein the wing tip device is connected to the wing by a hinge arrangement associated with the first spar and allowing pivoting about a fixed hinge axis perpendicular to the longitudinal axis of the first spar, and by a pivotal mounting arrangement associated with the second spar, the mounting arrangement being disposed in the second spar perpendicular thereto whilst mounting the wing tip device for pivoting about the fixed hinge axis, the hinge arrangement and the pivotal mounting arrangement being arranged to allow the wing tip device to rotate about the hinge axis between the flight configuration and the ground configuration.

2. An aircraft according to claim 1, in which the pivotal mounting arrangement comprises a spherical bearing mounted in the second spar.

3. An aircraft according to claim 1, wherein the wing tip device comprises a spar beam which has a first end fixed in the wing tip device and a second distal end which, in the flight configuration, is disposed in the wing.

4. An aircraft according to claim 3, wherein the spar beam passes through the hinge axis of the wing tip.

5. An aircraft according to claim 3, wherein the first and second spars comprise rear and front spars respectively and the distal end of the spar beam is disposed alongside the rear spar in the flight configuration.

6. An aircraft according to claim 1, in which a further spar is provided in the wing adjacent to the wing tip device, the further spar being disposed between the first and second spars.

7. An aircraft according to claim 5, in which the spar beam is interposed between the first spar and the further spar.

8. An aircraft according to claim 1, wherein the front and rear spars are of composite material.

9. An aircraft according to claim 1, wherein the wing tip device comprises a spar beam which has a first end fixed in the wing tip device and a second end which, in the flight configuration, is disposed in the wing wherein one or more actuators are provided for pivoting the wing tip device between the flight configuration and the ground configuration, the one or more actuators acting on the spar beam.

10. An aircraft according to claim 9, wherein a first actuator is provided for pivoting the wing tip device from the flight configuration to an intermediate configuration partway between the flight configuration and the ground configuration, and a second actuator is provided for pivoting the wing tip device from the intermediate configuration to the ground configuration.

11. An aircraft according to claim 10, wherein the first and second actuators are linear actuators.

12. An aircraft according to claim 9, wherein a single actuator is provided and is connected to a linkage that comprises a link that is connected to the spar beam and a link that is connected to the wing.

13. An aircraft according to claim 12, wherein the linkage comprises first and second links pivotally connected to each other at their first ends and pivotally connected to the spar beam and the wing respectively at their second ends, the actuator being pivotally connected to the first ends of the first and second links and to the wing.

14. An aircraft according to claim 12, wherein the single actuator is a linear actuator.

15. An aircraft according to claim 12, wherein the single actuator is a rotary actuator.

16. An aircraft according to claim 14, wherein the linkage comprises first and second links pivotally connected to each other at their first ends and connected by universal joints to the spar beam and the wing respectively at their second ends.

17. An aircraft according to claim 16, wherein a locking device is provided for locking the first ends of the links to the wing when the wing tip device is in the flight configuration.

18. An aircraft according to claim 16, wherein the first and second links extend along a substantially straight path when the wing tip device is in the ground configuration.

19. An aircraft according to any of claim 16, wherein top and bottom faces of the first and/or second links are effective to transfer loads between the wing tip device and the wing in the flight configuration of the wing tip device.

20. A wing for an aircraft according to claim 1.

* * * * *